US007451118B2

(12) United States Patent
McMeen et al.

(10) Patent No.: US 7,451,118 B2
(45) Date of Patent: Nov. 11, 2008

(54) SYSTEM AND METHOD FOR AUTOMATED RESPONSE PIECE

(75) Inventors: Susan McMeen, Burke, VA (US); Gregory Moore, Manassas, VA (US)

(73) Assignee: United States Postal Service, Washington, DC (US)

( * ) Notice: Subject to any disclaimer, the term of this patent is extended or adjusted under 35 U.S.C. 154(b) by 297 days.

(21) Appl. No.: 10/884,920

(22) Filed: Jul. 7, 2004

(65) Prior Publication Data

US 2006/0010085 A1    Jan. 12, 2006

(51) Int. Cl.
*G06F 9/00* (2006.01)
(52) U.S. Cl. .......................... 705/401; 705/1; 705/404; 705/406; 705/410; 700/224; 700/226
(58) Field of Classification Search ............... 705/1, 705/401, 410, 406, 404; 700/224, 226
See application file for complete search history.

(56) References Cited

U.S. PATENT DOCUMENTS

| | | | | |
|---|---|---|---|---|
| 5,319,562 | A * | 6/1994 | Whitehouse | 705/403 |
| 5,415,341 | A * | 5/1995 | Diamond | 229/80 |
| 5,737,729 | A * | 4/1998 | Denman | 705/401 |
| 6,459,953 | B1 * | 10/2002 | Connelly et al. | 700/224 |
| 6,775,590 | B2 * | 8/2004 | Pintsov et al. | 700/224 |
| 6,832,130 | B2 * | 12/2004 | Pintsov et al. | 700/224 |
| 6,925,450 | B2 * | 8/2005 | Foth et al. | 705/404 |
| 2002/0046196 | A1 * | 4/2002 | Ogg | 705/406 |
| 2003/0163421 | A1 * | 8/2003 | Van Ness et al. | 705/40 |
| 2003/0177021 | A1 * | 9/2003 | Dutta | 705/1 |
| 2005/0209979 | A1 * | 9/2005 | Poulin | 705/406 |

FOREIGN PATENT DOCUMENTS

| CH | 587731 | A | * | 5/1977 |
|---|---|---|---|---|
| CH | 587731 | A | * | 5/1977 |

OTHER PUBLICATIONS

Replymailonline.com.*
Citationsoftware.com; Citation Software News-May 2001.*
Replymailonline.com (Dec. 2, 2001).*
Citationsoftware.com (May 2001).*
"1995 Software Guide: Conveying the Message Faster, More Efficiently", Jun. 1995, Direct Marketing, p. 46, 11 pgs.*
Goldsmith, Dick, "20 ways to cut costs", Sep. 1994. Target marketing, vol. 17, Iss. 9; p. 44, 3pgs.*

(Continued)

*Primary Examiner*—John W Hayes
*Assistant Examiner*—Freda A. Nelson
(74) *Attorney, Agent, or Firm*—Finnegan, Henderson, Farabow, Garrett & Dunner, LLP

(57) ABSTRACT

System and method for creating response pieces. The response piece system authenticates a user, generates a standardized address based on address code information received from the user, and generates a response piece mailpiece based on the standardized address and the information received from the user. In additional embodiments, including an embodiment for prepaid response pieces, the response piece system generates a response piece permit based on permit information received from the user, generates a unique address code based on address code information received from the user, received payment of an identified fee, and generates the response piece mailpiece based on the permit and the unique address code.

14 Claims, 11 Drawing Sheets

OTHER PUBLICATIONS

"The Future of Snail Mail", Dec. 4, 1995, Information Week, p. 34, 9 pgs.*

Usps.com/replymail (Sep. 24, 2004).*

"Going E-Postal", Aug. 2000, Bank Technology News, v 13, n 8, p. 30, 3pgs.*

Schein, Eliot Dey; "Prepaid envelopes: are they necessary", Sep. 1986, Folio: the Magazine for management, v15, p. 173 (3 pgs).*

"United States Postal Service 2004 comprehensive statement on postal operations", Oct. 2004, Chapter 2, p. 30, 10 pgs.*

Replymailonline.com, http://webarchiv.org/web/ pp. 1-12 (Dec. 2001).

International Search Report for PCT/US05/24021, mailed Feb. 14, 2007.

* cited by examiner

SYSTEM AND METHOD FOR AUTOMATED RESPONSE PIECE

TECHNICAL FIELD

This invention relates generally to creating response pieces and, more particularly, a system and method for automatically creating response pieces.

BACKGROUND

A response piece refers to preaddressed mail, such as a postcard, letter, or an envelope, provided by a mailer to third parties, such as customers. Typically, a response piece is provided to elicit and, in some instances, expedite responses from third parties and to provide more accurate delivery. For example, a magazine may provide a response piece to its subscribers to elicit and expedite responses from its subscribers. Such responses may include a customer's name and address, subscription information, and/or payment information.

There are two types of response pieces: a prepaid response piece and an unpaid response piece. A prepaid response piece refers to a response piece that requires the mailer to pay the postage when it is returned. Examples of prepaid response pieces include Business Reply Mail™ (BRM) and Qualified Business Reply Mail™ (QBRM) provided by the United States Postal Service (USPS). An unpaid response piece refers to a response piece that requires the sender to pay the postage before mailing. An example of an unpaid response piece is Courtesy Reply Mail™ (CRM) from USPS.

Presently, creating and distributing a response piece is cumbersome, time consuming, and expensive. To create CRM, the mailer must physically travel to the post office to apply for a standardized address and then the mailer must design the mailpiece according to specifications. To create BRM, a mailer must first physically travel to the local post office to apply for a permit, a standardized address, and a unique address code, and pay the appropriate fees. Finally, the mailer must design a mailpiece according to specifications.

To apply for a BRM permit, a mailer must travel to a local post office to fill out an application and remit payment to USPS. In addition, the mailer must travel to the local post office to pay the periodic permit fees.

To apply for a standardized address and a unique address code (or ZIP+4 Code), a mailer must travel to the local post office to fill out an application, which, for BRM, may be included with the application for the BRM permit. A standardized address contains all delivery address elements as matched against USPS records and contains the correct city name, state, and ZIP Code. A unique address code is based in part on the standardized address. A unique address code refers to a number that is typically the mailer's ZIP Code plus four extra digits. This unique address code, thus, can be referred to as a ZIP+4 number. The 4-digit add-on number identifies a high-volume receiver of mail for efficient mail sorting and delivery. ZIP+4 numbers are typically used by business mailers who prepare their mail with typewritten, machine-printed, or computerized addressing formats that can be read by the USPS's automated scanners during processing.

Finally, after receiving a BRM permit and an address code, the mailer must design the mailpiece, very often using expensive drafting equipment. The mailer must design the mailpiece according to format specifications set forth by USPS in the Domestic Mail Manual. Furthermore, for QBRM, a mailer is required to receive approval from a Mailpiece Design Analyst (MDA). For BRM, the mailer is advised to receive MDA approval.

Therefore, it is desirable to provide an automated response piece system that allows a mailer to automatically and efficiently create and distribute response pieces.

SUMMARY

Consistent with the invention, there is provided a computer implemented method for automatically creating response pieces. The method includes authenticating a user; receiving address code information from the user; generating a standardized address based on the address code information; receiving design information for designing a response piece mailpiece; and generating the response piece mailpiece based on the standardized address and the design information.

Additional embodiments, including an embodiment for creating prepaid response pieces, can include receiving permit information for a response piece from a user; generating a response piece permit based on the permit information; generating a unique address code based on the address code information and the standardized address; receiving payment of an identified fee; and generating the response piece mailpiece based on the standardized address, the response piece permit, the unique address code, and the design information.

Also provided is a system for creating response pieces. The system includes a registration system for authenticating a user. The system also includes an application server that may include a permit application for receiving permit information from a user and generating a response piece permit based on the received permit information; an address code application for receiving address code information from the user and returning a standardized address and a unique address code based on the address code information; and a design application for receiving design information from the user and generating the response piece mailpiece based on the address code, the permit information, and the design information.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

DESCRIPTION OF THE EMBODIMENTS

Reference will now be made in detail to an exemplary embodiment consistent with the invention, an example of which is illustrated in the accompanying drawings. Wherever possible, the same reference numbers will be used throughout the drawings to refer to the same or like parts.

Figure 1:
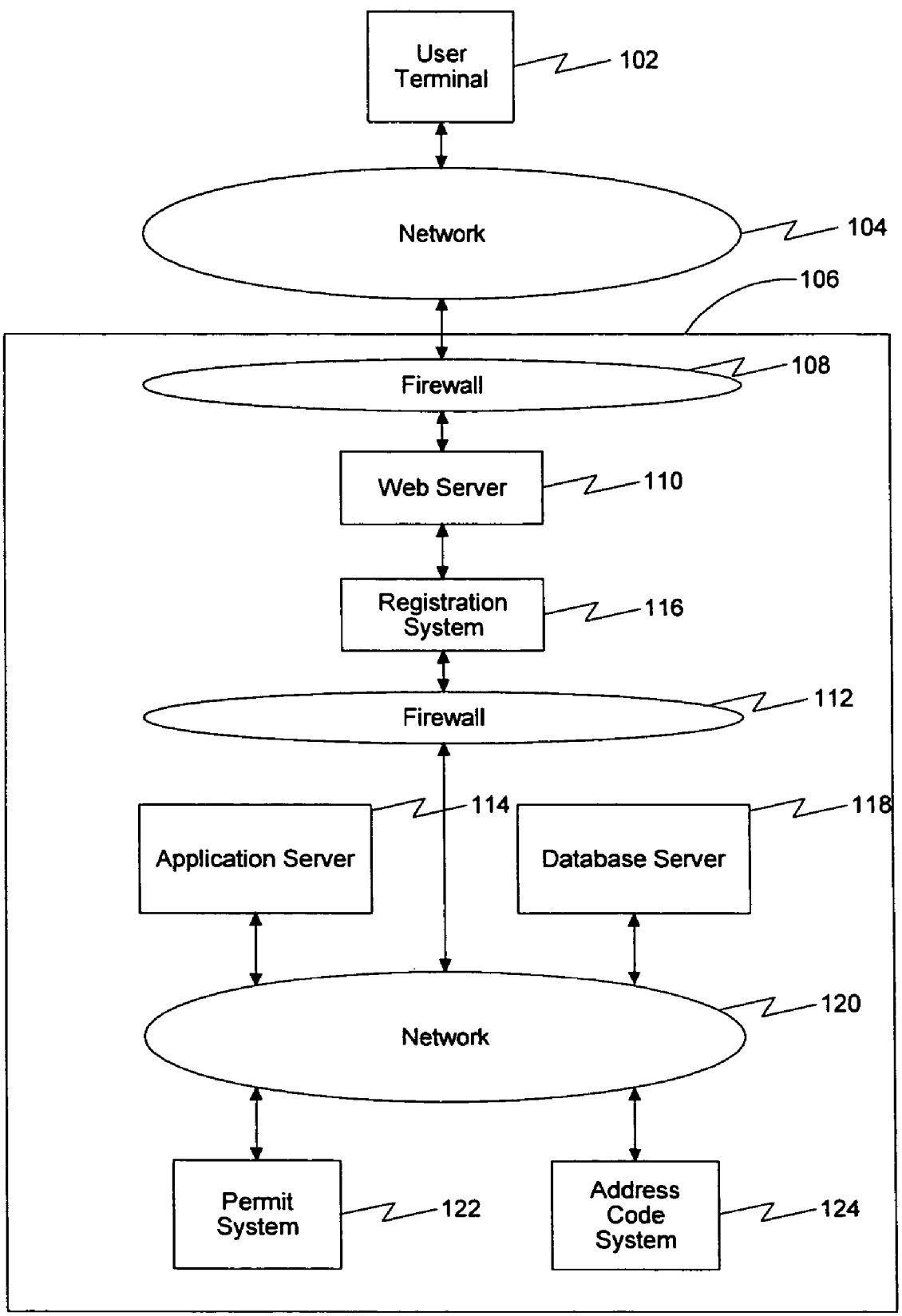
FIG. 1 depicts a block diagram of an exemplary system environment, in accordance with systems and methods consistent with the present invention.

FIG. 1 depicts a block diagram of an exemplary system environment, in accordance with systems and methods consistent with the present invention. As illustrated, a user terminal 102 connects to a network 104. Network 104 may be implemented through any suitable combination of wired and/or wireless communication networks. For example, network 104 may be implemented through a wide area network (WAN), local area network (LAN), an intranet and/or the Internet. Additionally, network 104 may utilize any suitable type of network protocol. For ease of explanation, network 104 will be hereinafter referred to as Internet 104 and will be assumed to use TCP/IP (Transport Control Protocol/Internet Protocol). User terminal 102 may be any type of a user terminal, and may be for example, a user computer or data processor executing a web browser type program, such as Microsoft's Internet Explorer or a Netscape browser. Accordingly, user terminal 102 may include a processor, memory, storage, and an interface for connecting to Internet 104.

Additionally, an automated response piece system 106 connects to Internet 104. As illustrated, automated response piece system 106 includes a web server 110 connected to Internet 104 via a firewall 108. In one embodiment, automated response piece system 106 communicates with user terminal 102 through web server 110. Web server 110 may be any type of data processor or computer and may include, for example, a processor, memory, storage, and interfaces. Web server 110, in one embodiment, stores a set of web pages for interfacing with user terminal 102. User terminal 102 sends information to web server 110, which may then send the information to other systems and subsystems of automated response piece system 106 such as a registration system 116 or an application server 114. Similarly, to send information to user terminal 102, the systems and subsystems of automated response piece system 106 send information to web server 114, which formats the information and sends it to user terminal 102.

Registration system 116 functions to register and authenticate users of automated response piece system 106. In one embodiment, registration system 116 may include at least one data processor, or computer, and at least one database for storing user authentication data. Registration system 116 connects to a network 120 through a firewall 112. Firewalls 108 and 112 may be any appropriate type of firewall, such as, for example, commercially available firewalls. Once a user has been authenticated, registration system 116 authorizes the user terminal 102 to communicate with application server 114 through web server 110 and network 120.

Network 120 connects the systems associated with automated response piece system 106. Network 120 may be, for example, an internal network for an organization providing postal delivery services. For ease in explanation, network 120 will be hereinafter referred to as intranet 120. One of skill in the art will recognize, however, that intranet 120 in other embodiments may be any type of communication medium or channel and may include, alone or in any suitable combination, a telephony-based network, a local area network (LAN), a wide area network (WAN), a dedicated intranet, the Internet, a wireless network, or a bus. Moreover, in one embodiment, network 106 may include or be a part of a communications network, such as the Internet or a corporate intranet that is compatible with a networking protocol such as TCP/IP.

A database server 118 stores data associated with users of automated response piece system 106. Database server 118 may store information that can be accessed through a conventional database protocol, such as Structured Query Language (SQL). Although not depicted in FIG. 1, one of ordinary skill in the art will recognize that database server 118 may include a computer or data processor for accessing, searching, and/or processing stored information. Further, one of ordinary skill in the art will recognize that database server 118 may be implemented using a plurality of databases.

A permit system 122 functions to authorize a response piece permit, such as a BRM permit from the USPS, and also functions to process payments of fees associated with the response piece permit. Permit system 122 may be implemented as a computer or network of computers and a database or set of databases that receives information associated with a user's request to apply for a response piece permit or to pay response piece permit fees, processes the information, and provides a valid response piece permit and/or a confirmation of payment in response. An example of such a system is USPS's Postal One!® system. Processing payment of response piece fees may include debiting an account, verifying credit card information, or performing an Electronic Fund Transfer (EFT) on an Automated Clearing House (ACH) account as is understood by one of skill in the art. An example of an ACH account is a Centralized Accounting Payment System (CAPS) account from USPS.

An address code system 124 functions to provide a standardized address and a unique address code. As will be understood by one of skill in the art, the address code can then be converted to a bar code, which will be read by mail processing equipment to ensure efficient and accurate delivery of the returned response piece. Address code system 124 may be implemented as a computer or network of computers and a database or set of databases that receives information associated with a user's request to apply for an address code, standardizes the address information, and provides a unique address code. An example of such a system is USPS's Address Management System.

Figure 2:
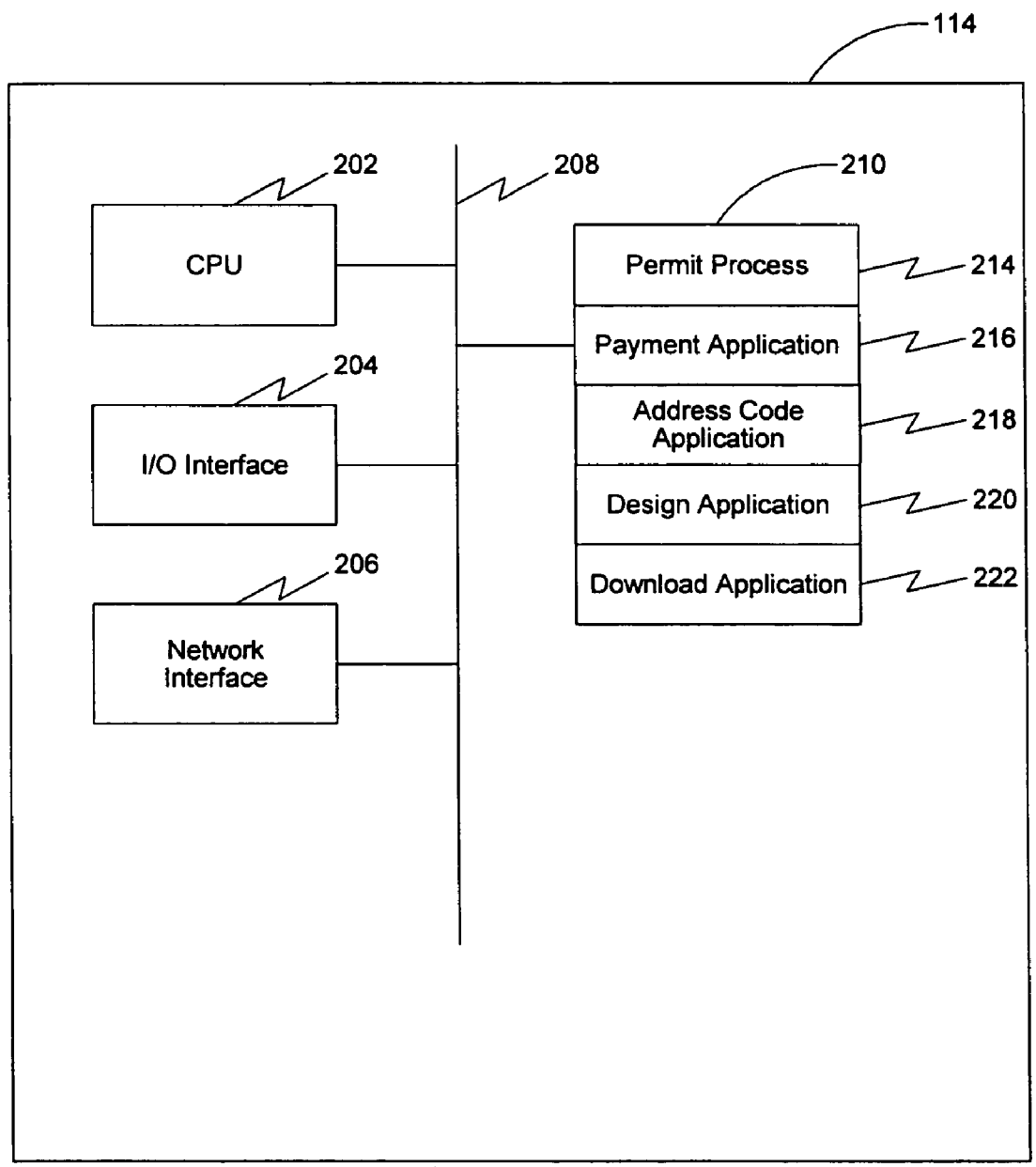
FIG. 2 depicts a block diagram of an exemplary application server, in accordance with systems and methods consistent with the present invention.

Application server 114 may be embodied as a data processor, such as a computer, that functions to execute response piece applications. FIG. 2 depicts a block diagram of an exemplary application server 114, in accordance with systems and methods consistent with the present invention. Application server 114 includes at least one central processing unit (CPU) 202, an I/O interface 204, a network interface 206, and memory 210. CPU 202 executes instructions associated with the applications contained in memory 210 and transmits results to other subsystems in application server 114 over a high speed interconnect or data bus 208. I/O interface 204 is an interface used to couple application server 114 with devices such as a keyboard, a mouse, a display device, and any other I/O device useful in operating and managing application server 114 as is understood by one of skill in the art. Network interface 206 is used to communicate with intranet 120 (FIG. 1).

Memory 210 includes in one embodiment: a permit application 214 having program instructions that when executed receives permit information and generates and stores a response piece permit; a payment application 216 having program instructions that when executed receives and processes payment information; an address code application 218 having program instructions that when executed receives address code information including an address, standardizes the address, and generates a unique address code; a design application 220 having program instructions that when executed receives design information, generates a replay mail mailpiece, stores the response piece mailpiece, and delivers the response piece mailpiece to the user; and a download application 222 having program instructions that when executed retrieves a stored mailpiece and sends it to the user for download and printing.

Referring to FIG. 1, a user may initiate a request to create a response piece by contacting web server 110 using a web browser executing on user terminal 102. For example, a user may select to connect to web server 110 using the web browser by entering a Uniform Resource Locator (URL) identifying web server 110 (e.g., the USPS website).

In response, user terminal 102 may contact the web server 110 via Internet 104, where firewall 108 is programmed to permit information regarding a web page for the web server 110 to be sent to the user terminal 102. In response, a web page is displayed on user terminal 102 using the web browser.

In one embodiment, web server 110 sends a web page prompting a user to select a type of response piece to create. For example, the page may include a button to select a prepaid response piece, such as BRM, and a button to select an unpaid response piece, such as CRM. Web server 110 may also, in one embodiment, send a web page or web pages providing information to a mailer describing the various types of response pieces. Such a web page, or web pages, may be provided through a link or links as is understood by one of skill in the art.

Figure 3A:
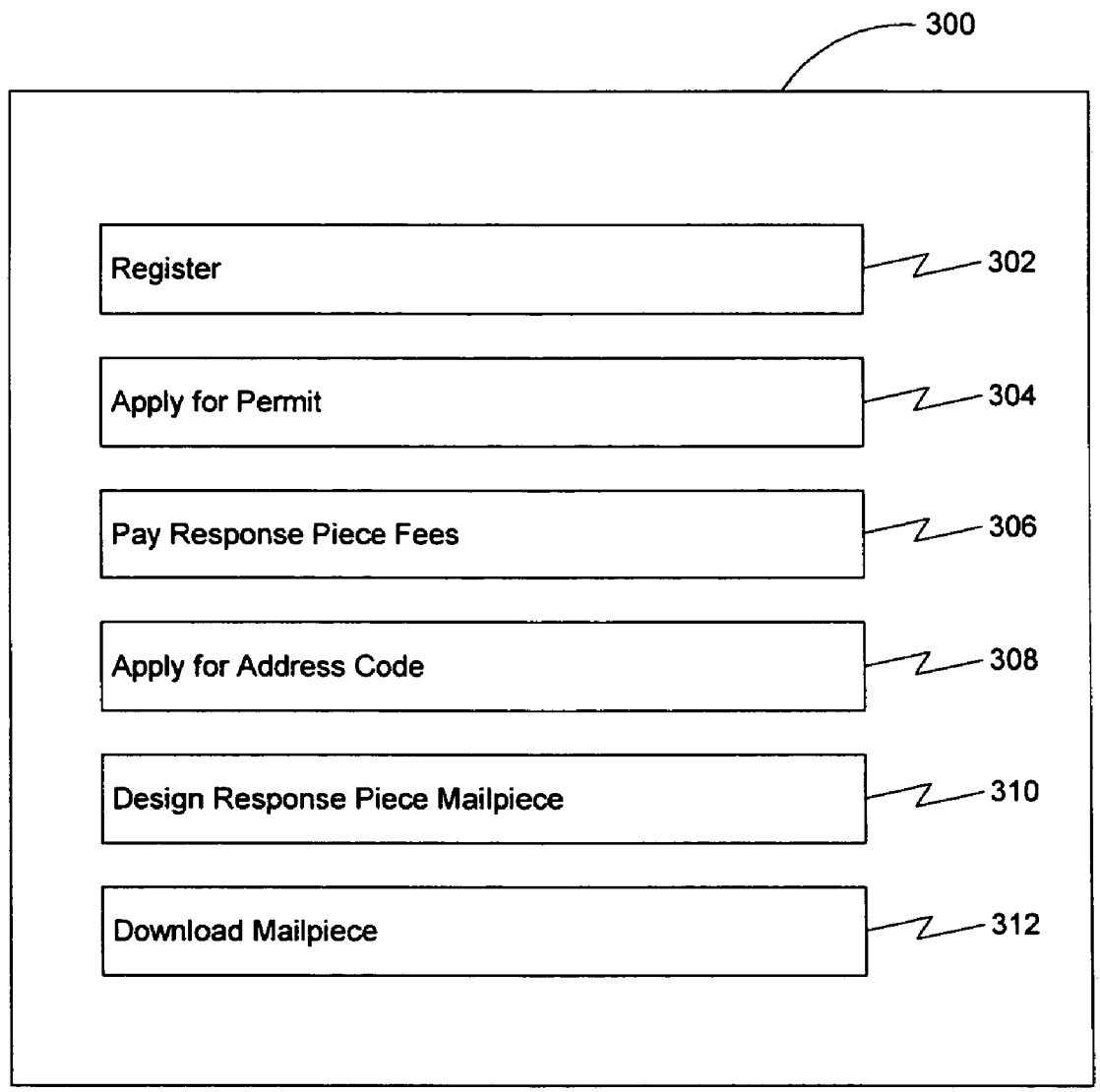
FIG. 3A depicts a diagram of an exemplary computer screen shot for user selection of response piece functions for a prepaid response piece, in accordance with systems and methods consistent with the present invention.

FIG. 3A depicts a diagram of an exemplary computer screen shot for user selection of prepaid response piece functions, in accordance with systems and methods consistent with the present invention. A display screen 300 may provide buttons that a user may activate to select the type of service he desires. For example, as illustrated screen 300 may provide the user with a button 302 to register, a button 304 to apply for a permit, a button 306 to pay response piece fees, a button 308 to apply for an address code, a button 310 to design a response piece mailpiece, and a button 312 to download a mailpiece. A user may then click on the button for the type of service they wish to request using, for example, a mouse.

Figure 3B:
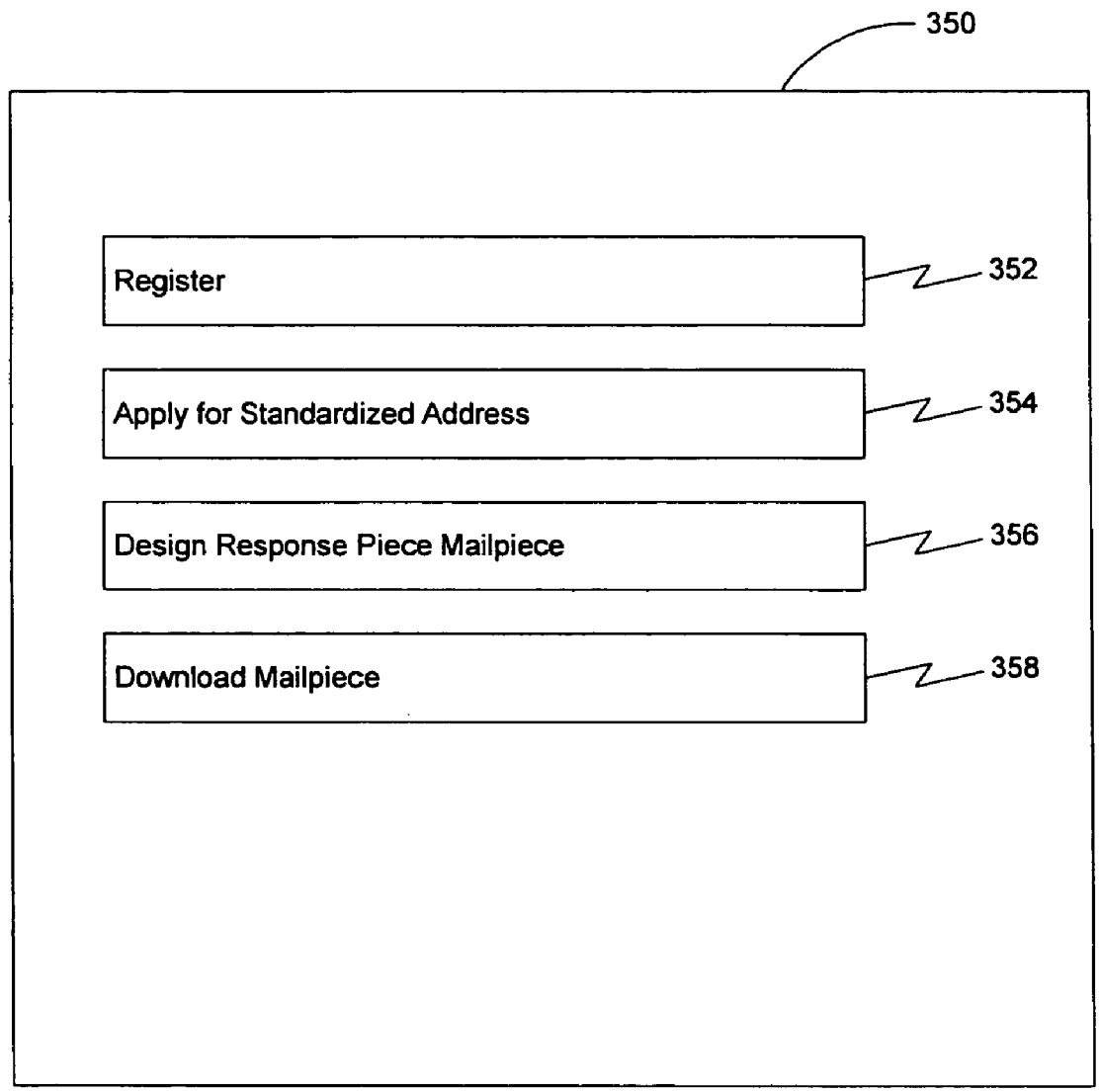
FIG. 3B depicts a diagram of an exemplary computer screen shot for user selection of response piece functions for an unpaid response piece, in accordance with systems and methods consistent with the present invention.

FIG. 3B depicts a diagram of an exemplary computer screen shot for user selection of response piece functions for an unpaid response piece, in accordance with systems and methods consistent with the present invention. A display screen 350 may provide buttons that a user may activate to select the type of service he desires. For example, as illustrated screen 350 may provide the user with a button 352 to register, a button 354 to apply for a standardized address, a button 356 to design a response piece mailpiece, and a button 358 to download a mailpiece. A user may then click on the button for the type of service they wish to request using, for example, a mouse.

Figure 4:
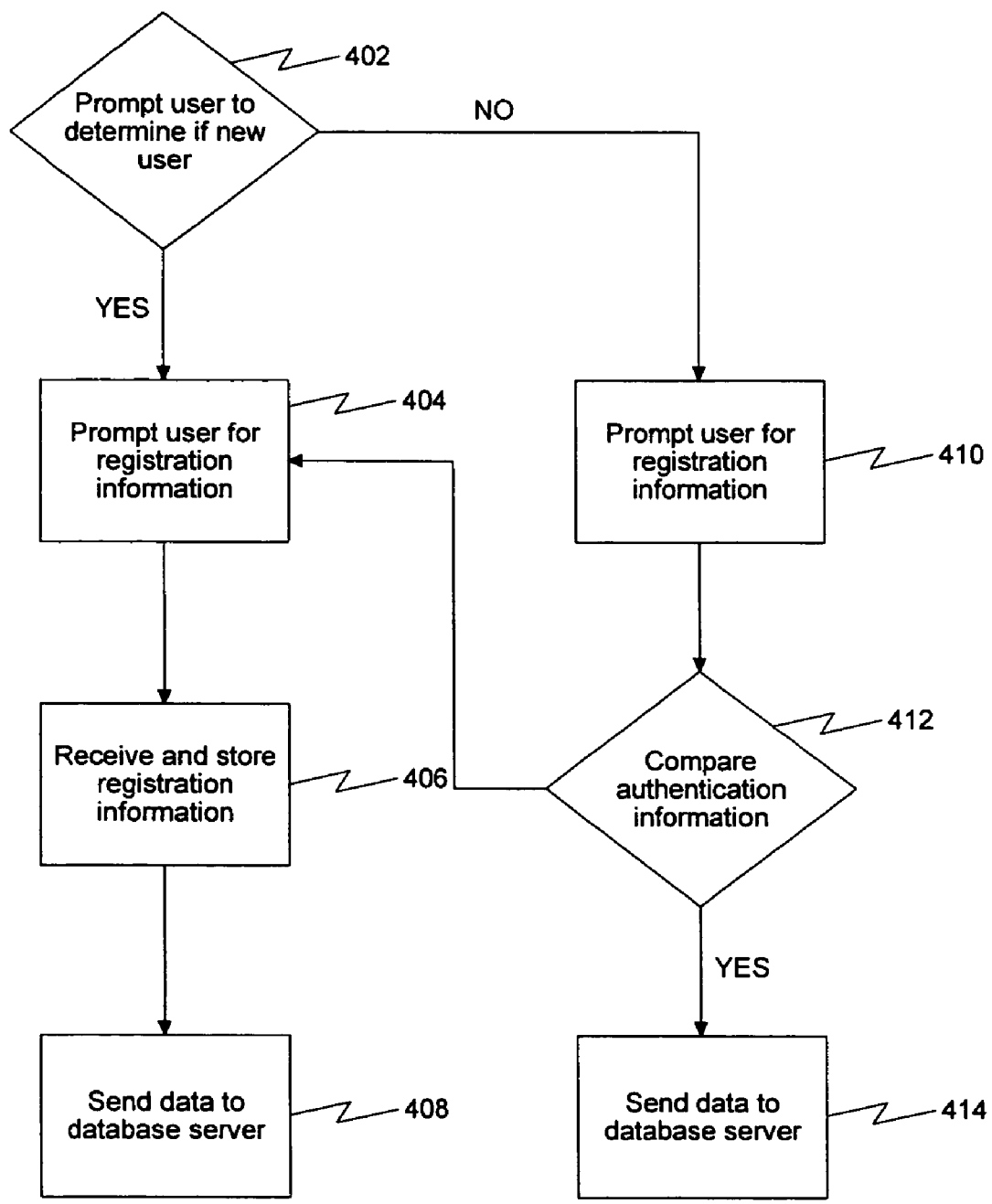
FIG. 4 depicts a flow diagram of an exemplary registration process, in accordance with systems and methods consistent with the present invention.

In one embodiment, a user must register before the user can select any of the other response piece services. FIG. 4 depicts a flow diagram of an exemplary registration process, in accordance with systems and methods consistent with the present invention. The flow diagram will be described with reference to the embodiment of the system depicted in FIG. 1 and application server 114 depicted in FIG. 2. First, web server 110 sends user terminal 102 a web page to determine (step 402) if the user is a new user. If the user is a new user, web server 110 prompts (step 404) the user to submit registration information, which may include identification information such as the user's name and address, the user's company name, and/or the user's email address. Web server 110 may also prompt the user for information for authentication such as a user name and a password. Web server 110 may receive the registration information from user terminal 102 and send it to registration system 116. Registration system 116 receives and stores (step 406) the registration information including the authentication information. In addition, registration system 116 may send (step 408) user identification data from the registration information, such as the user's name and address and the company name, to database server 118.

If the user is not a new user, web server 110 may prompt (step 410) the user for authentication information such as, for example, a user name and password. Web server 110 sends the authentication information to registration system 116. Registration system 116 compares (step 412) the received authentication information with authentication information stored in its database to determine if the user is a valid user of automated response piece system 106. If authentication fails, registration system 116 may, through web server 110, prompt (step 404) user to enter registration information. If authentication is successful, registration system 116 may authorize (step 414) the user to access response piece services provided by application server 114.

Figure 5:
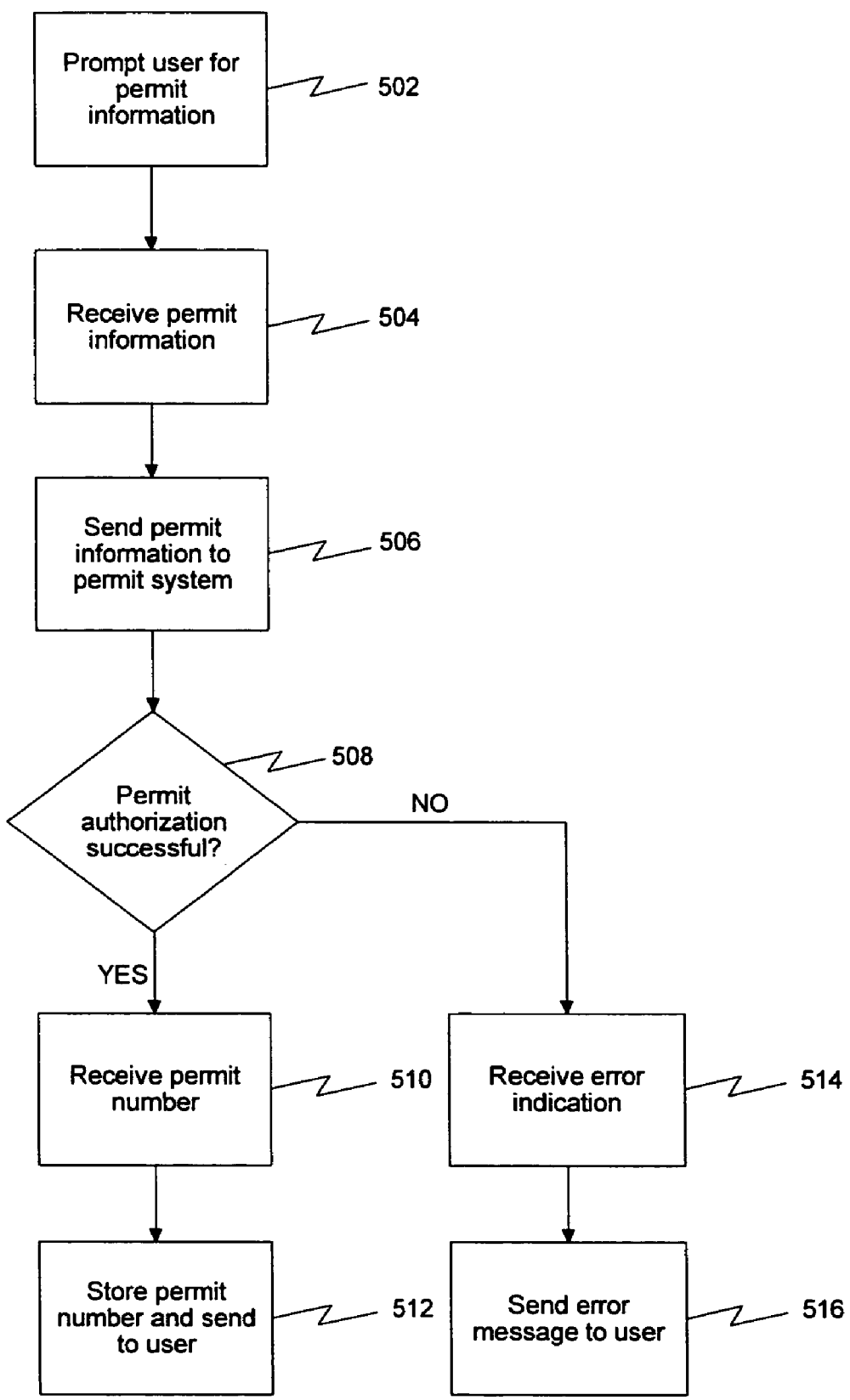
FIG. 5 depicts a flow diagram of an exemplary permit process, in accordance with systems and methods consistent with the present invention.

After a user has successfully registered and been authenticated, if the user has selected to create a prepaid response piece, web server 110 may re-send screen 300 (FIG. 3A) for display to a user, allowing the user to select button 304 to apply for a business reply permit. FIG. 5 depicts a flow diagram of an exemplary permit process, in accordance with systems and methods consistent with the present invention. The flow diagram will be described with reference to the embodiment of the system depicted in FIG. 1 and application server 114 depicted in FIG. 2. Web server 110 prompts (step 502) a user for permit information. Permit information is any information relating to application for a response piece permit and may include user identification information such as the user's name, address, and company name, the ZIP code of the issuing post office, the type of permit a user would like to purchase, and payment information. In one embodiment, the different types of permits may be according to the volume of response pieces the user expects to be returned, such as basic BRM, high volume BRM, basic QBRM, or high volume QBRM from USPS. Payment information, in one embodiment, may include credit card information debit account information, or ACH account information.

The user enters the permit information and sends it from user terminal 102 to web server 110, which forwards it to application server 114. Upon receipt of the permit information, CPU 206 of application server 114 executes permit application 214. Permit application 214 receives (step 504) the permit information. Permit process 214 then sends (step 506) the permit information to permit system 122. If permit authorization from permit system 122 was successful (step 508), permit application 214 receives (step 510) a valid response piece permit number, stores it in database server 118, and sends (step 512) it to user terminal 102 through web server 110. If permit authorization was unsuccessful (step 508), permit application 214 receives (step 514) an error indication from permit system 122 and sends (step 516) an error message identifying the error to user terminal 102 through web server 110.

Figure 6:
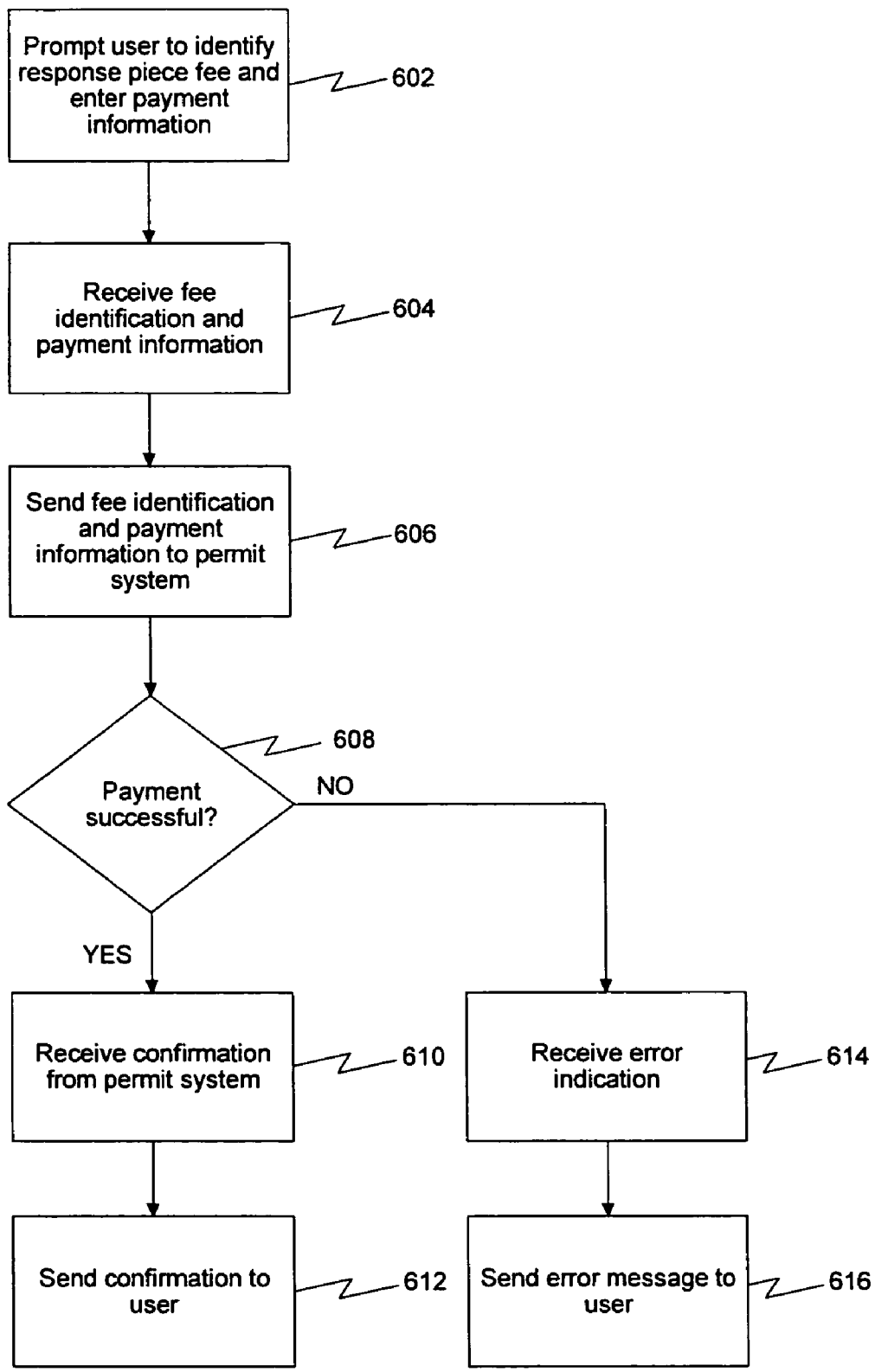
FIG. 6 depicts a flow diagram of an exemplary payment process, in accordance with systems and methods consistent with the present invention.

Permits may include periodic fees in addition to the initial application fee. Such fees may include accounting fees or fees related to postage. Referring to FIG. 3, a user creating a prepaid response piece may pay the response piece permit fees by selecting button 306 of screen 300. FIG. 6 depicts a flow diagram of an exemplary payment process, in accordance with systems and methods consistent with the present invention. The flow diagram will be described with reference to the embodiment of the system depicted in FIG. 1 and application server 114 depicted in FIG. 2. Web server 110 prompts (step 602) a user to identify the response piece fee and to enter payment information, such as credit card information, debit account information, or ACH account information. In one embodiment, a user may have incurred multiple fees because, for example, a user may own multiple response piece permits. In another embodiment, a user will only pay fees associated with a single permit. The user from the user terminal 102 sends the fee identification and the payment information to web server 110, which forwards it to application server 114. Payment application 216 of application server 114, executed by CPU 206, receives (step 604) the fee identification and the payment information entered and sent by the user. Payment application 216 then sends (step 606) the fee identification and the payment information to permit system 122. Permit system 122 processes the payment information by, in one embodiment, debiting an account, verifying credit card information, or performing an EFT on an ACH account as is understood in the art. If payment was successful (step 608), payment application 216 receives (step 610) a confirmation from permit system 122. In response, payment application 216 sends (step 612) a confirmation to user terminal 102 through web server 110. If payment was unsuccessful (step 608), payment application 216 receives (step 614) an error indication from permit system 122, then sends (step 616) an error message to user terminal 102 through web server 110.

Figure 7:
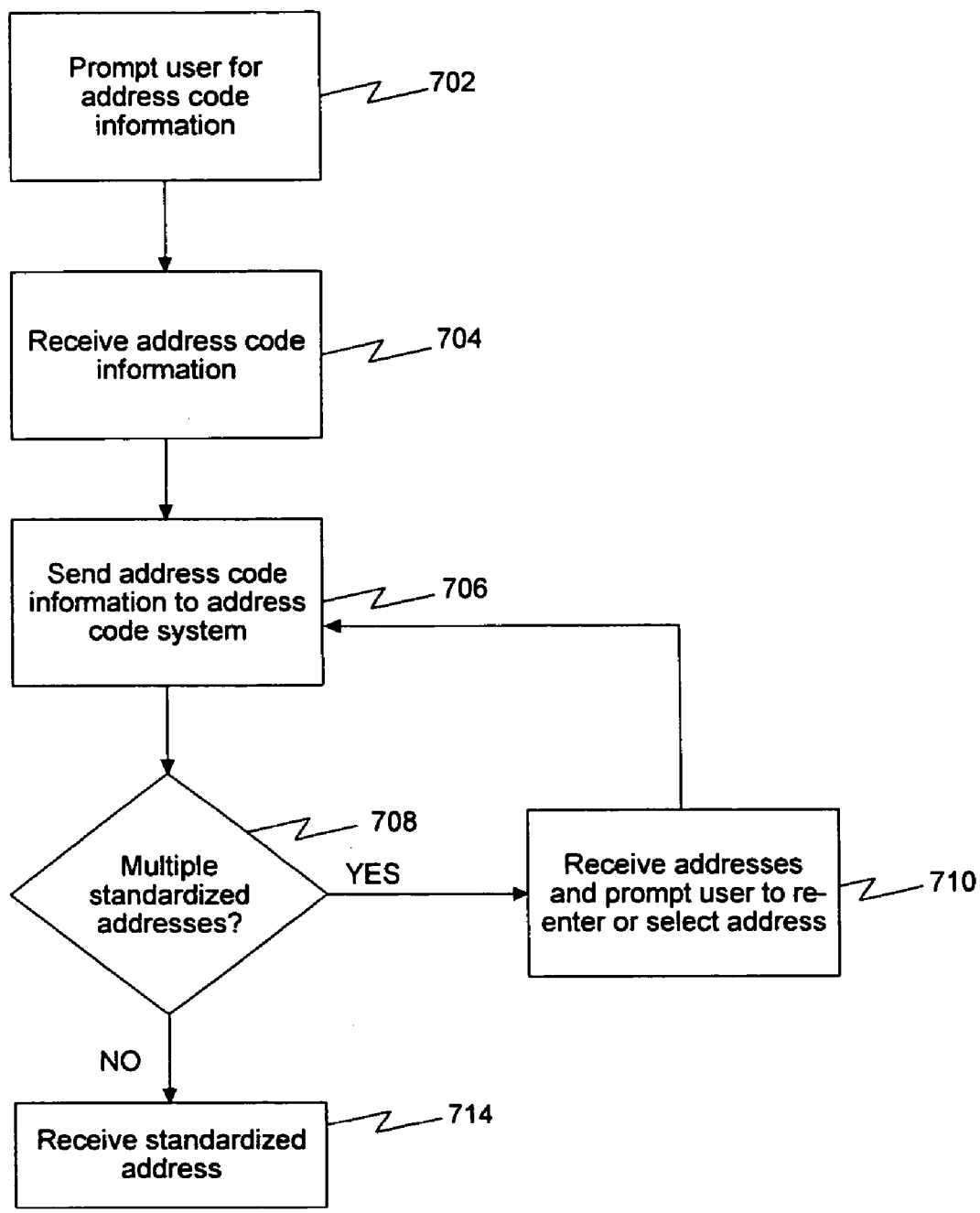
FIG. 7 depicts a flow diagram of an exemplary standardized address process, in accordance with systems and methods consistent with the present invention.

The user can receive a standardized address and an address code by selecting button 308 of screen 300 (FIG. 3A) if the user is creating a prepaid response piece, or just a standardized address by selecting button 354 of screen 350 (FIG. 3B) if the user is creating an unpaid response piece. FIG. 7 depicts a flow diagram of an exemplary standardized address process, in accordance with systems and methods consistent with the present invention. The flow diagram will be described with reference to the embodiment of the system depicted in FIG. 1 and application server 114 depicted in FIG. 2. First, web server 110 prompts (step 702) a user to provide address code information, which is information associated with applying for a unique address code such as, for example, the user's address including ZIP code and the response piece card or letter type. Web server 110 forwards the address code information to web server 110, which sends it to application server 114. Address code application 218 of application server 114, executed by CPU 206, receives (step 704) the address code information sent by the user and sends (step 706) the address code information to address code system 124. If address code system 124 determines multiple standardized addresses (step 708) corresponding to the user's address, address code application 218 receives an indication from address code system 124 and communicates with web server 110 to prompt (step 710) the user to re-enter the correct address. In alternative embodiments, address code system 124 can return multiple addresses, which address code application 218 can forward to the user for selection of the appropriate address. After receiving the user's response from web server 110, address code application 218 can re-send (step 706) the user's address to address code system 124. After address code system 124 has determined a single standardized address, address code application 218 receives (step 714) the standardized address from address code system 124. In one embodiment, address code application 218 may also send the standardized address to the user through web server 110 and store the standardized address in database server 118.

Figure 8:
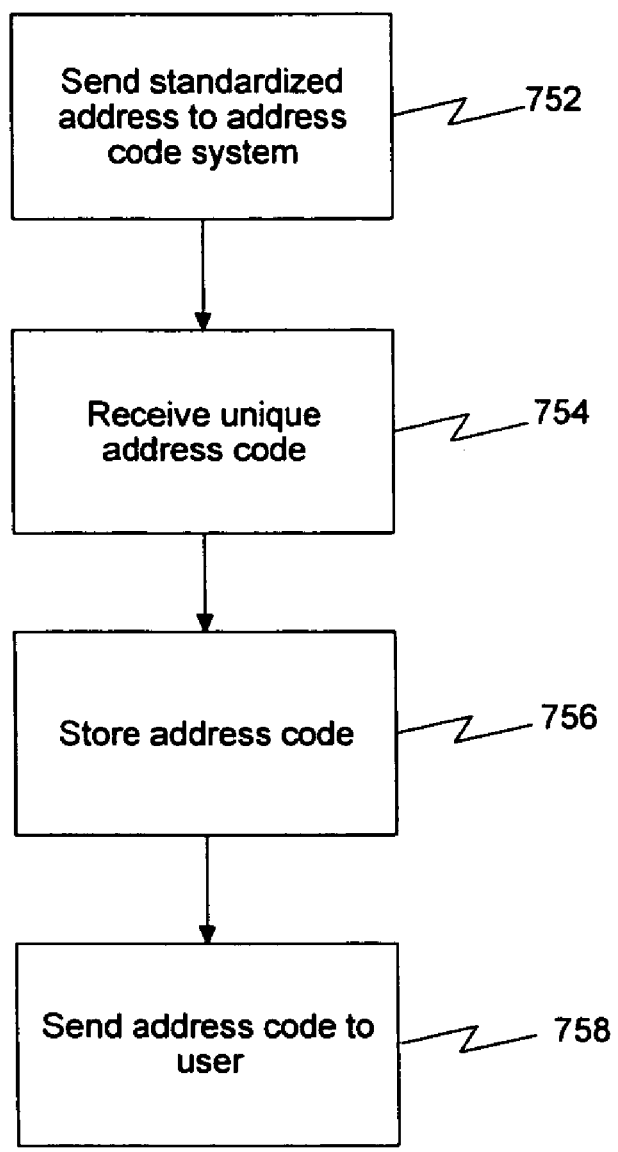
FIG. 8 depicts a flow diagram of an exemplary address code process, in accordance with systems and methods consistent with the present invention.

A user creating a prepaid response piece will require a unique address code in addition to a standardized address. FIG. 8 depicts a flow diagram of an exemplary address code process, in accordance with systems and methods consistent with the present invention. The flow diagram will be described with reference to the embodiment of the system depicted in FIG. 1 and application server 114 depicted in FIG. 2. Address code application 218 of application server 114, executed by CPU 206, sends (step 752) the standardized address to address code system. The address code application 718 then receives (step 754) a unique address code from address code system 124 based on the standardized address and the address code information sent by the user (step 706 of FIG. 7) and the user's standardized address, generated during standardized address process depicted in FIG. 7. Address code application 218 can then store (step 756) the unique address code in database server 118 and send (step 758) the unique address code to the user through web server 110.

Figure 9:
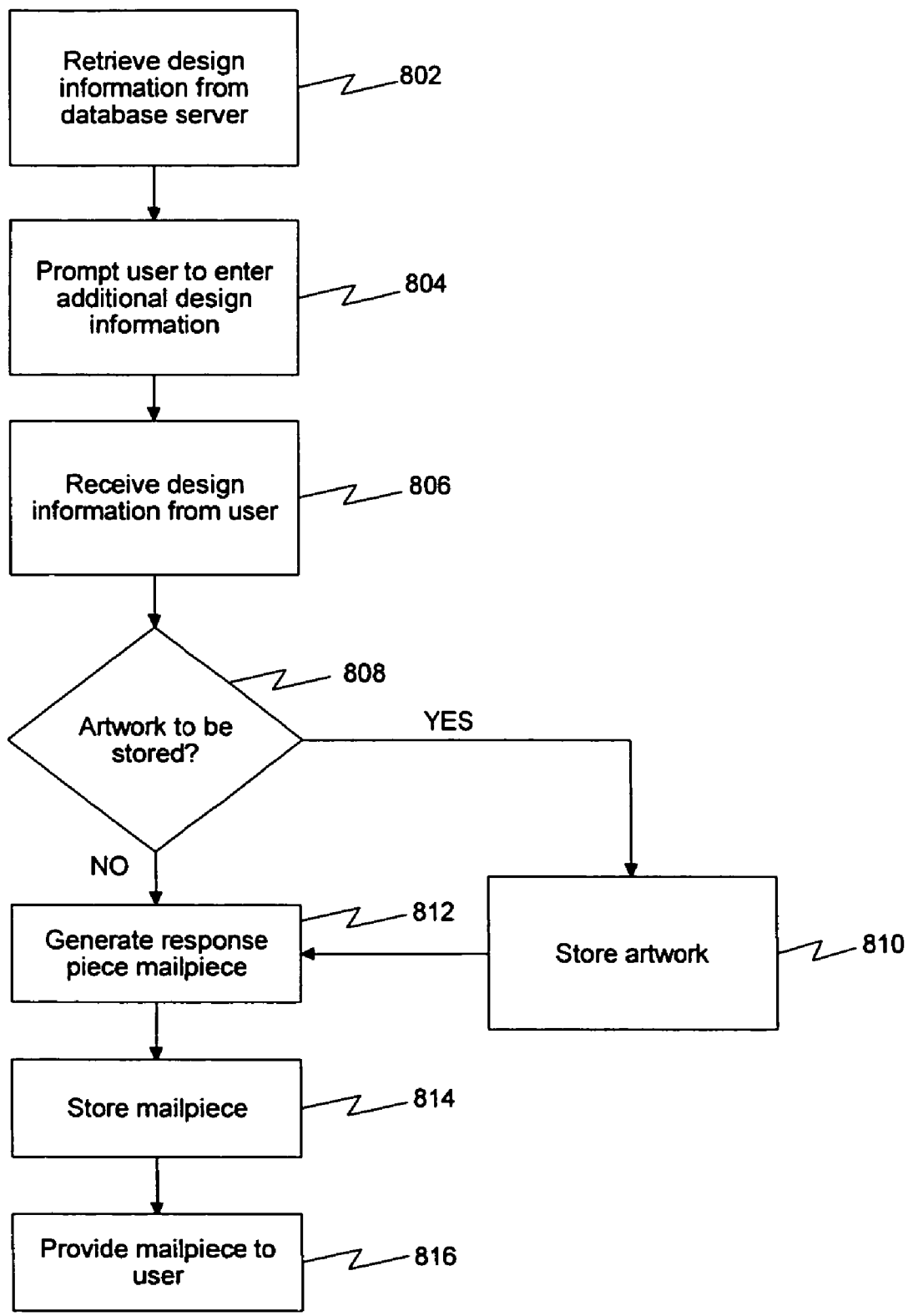
FIG. 9 depicts a flow diagram of an exemplary design process, in accordance with systems and methods consistent with the present invention.

After a user creating a prepaid response piece has received a response piece permit and a unique address code, the user can design a response piece mailpiece by selecting button 310 of screen 300 (FIG. 3A). A user creating an unpaid response piece can design a response piece mailpiece after receiving a standardized address by selecting button 356 of screen 350 (FIG. 3B). FIG. 9 depicts a flow diagram of an exemplary design process, in accordance with systems and methods consistent with the present invention. The flow diagram will be described with reference to the embodiment of the system depicted in FIG. 1 and application server 114 depicted in FIG. 2. Upon receiving the user's request to design a response piece mailpiece, CPU 206 of application server 114 executes design application 220. Design application 220 may retrieve (step 802) design information from the database server 118 to generate the response piece mailpiece. For example, design application 220 may retrieve the user's company name and address, card or letter type, permit number, and address code. For a user creating a prepaid response piece, design application 220 may also retrieve the user's permit number and address code. Design application 220 may also retrieve artwork stored by the user as described below. Design application 220 may use this information to design the response piece mailpiece by, for example, printing the permit number and company information on the mailpiece and also applying the bar code corresponding to the address code. Web server 110 may also prompt (step 804) a user to enter additional design information, which may include the size of the response piece card or letter, the font type and size, and artwork such as a company's logo. A user may upload the artwork, which may be in any suitable electronic format such as a jpeg or bitmap, as is understood by one of skill in the art. In one embodiment, if the user requests to store the artwork (step 808), design application 220 receives (step 806) the user's artwork from web server 110 and stores (step 810) it in database server 118.

After retrieving the design information from database server 118 and from the user, design application 220 can generate (step 812) the response piece mailpiece according to response piece specifications. An example of response piece specifications can be found in the Domestic Mail Manual from USPS, which is hereby expressly incorporated by reference. As set forth above, a response piece mailpiece will include a bar code corresponding to the address code. A prepaid response piece mailpiece will also include a permit number.

In addition, design application 220 can generate a response piece mailpiece that includes additional bar codes or additional unique optically-readable codes, such as the PLANET® code or POSTNET® codes, currently in use by USPS, for alerting mail processing equipment to perform a function on the response piece when it is returned. An example of such a code is a Face Identification Marking (FIM) code that alerts mail processing equipment to sort the response pieces based on the postage requirements. Other codes may be particularly useful for users creating a prepaid response piece because the codes can alert the mail processing equipment to record return of the mailpiece for billing purposes or to read information from the returned mailpiece to provide to the user. An example of such information may include a customer name and address, subscription information, and/or payment information. Mail processing equipment refers to equipment that processes a response piece when it is returned, which may perform a function on the response piece when it reads a certain code. An example of such mail processing equipment is the Advanced Facer Canceller System (AFCS) used by USPS.

Design application 220 generates the response piece mailpiece in any suitable design format such as the file formats used by Adobe Illustrator or Macromedia Freehand, as is understood by those skilled in the art. In one embodiment, design application 220 can then store (step 816) the response piece mailpiece in database server 118 and provide (step 814) the mailpiece to user terminal 102 through web server 110. In one embodiment, a user can download the response piece mailpiece to user terminal 102 through Internet 104. In other embodiments, design application 220 can electronically mail the response piece mailpiece to an email address provided by the user. The user, through user terminal 102, may also provide a name for the mailpiece, which design application 220 can associate with the stored mailpiece for subsequent reference by the user.

Figure 10:
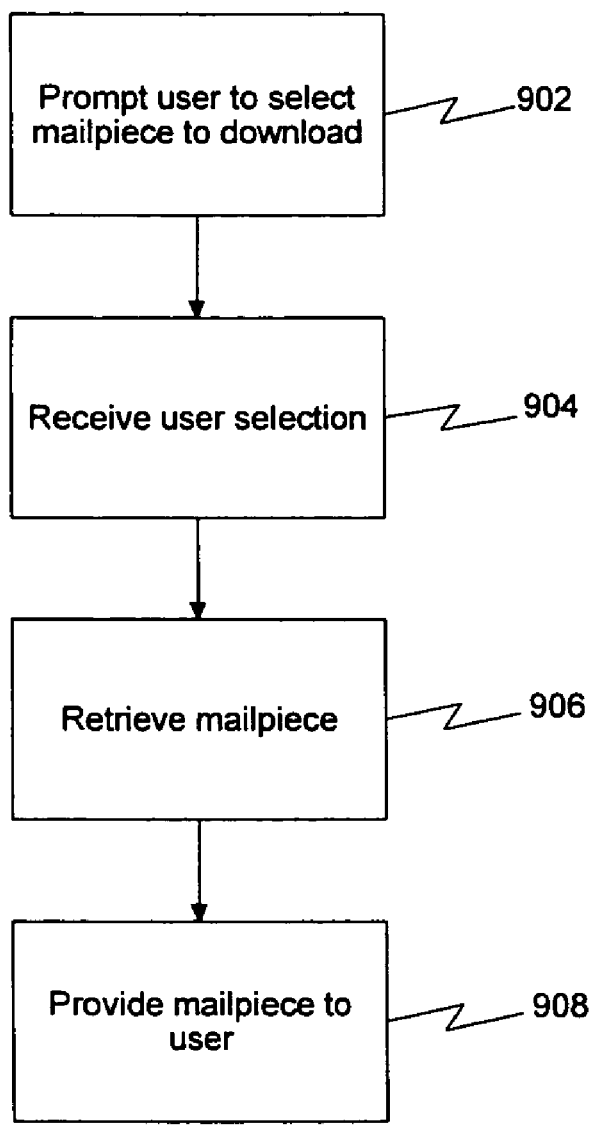
FIG. 10 depicts a flow diagram of an exemplary download process, in accordance with systems and methods consistent with the present invention.

A user can download a saved response piece mailpiece for editing or printing by selecting button 312. Upon receiving the user's request to download a mailpiece, CPU 202 of application server 114 executes download application 222. FIG. 10 depicts a flow diagram of an exemplary download process, in accordance with systems and methods consistent with the present invention. The flow diagram will be described with reference to the embodiment of the system depicted in FIG. 1 and application server 114 depicted in FIG. 2. Download application 222, through web server 110, prompts (step 902) a user to select the mailpiece to download. Upon receiving (step 904) the selection, download application 222 retrieves (step 906) the selected mailpiece from database server 118 and provides (step 908) it to user terminal 102. In one embodiment, a user can download the response piece mailpiece to user terminal 102 through Internet 104. In other embodiments, download application 222 can electronically mail the response piece mailpiece to an email address provided by the user.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A system for creating a response piece mailpiece comprising:
   a registration system for authenticating a user; and
   an application server comprising:
      a central processing unit;
      an address code application configured for execution by the central processing unit comprising instructions for receiving address code information and returning a standardized address based on the address code information;
      a permit application configured for execution by the central processing unit comprising instructions for receiving permit information and generating a response piece permit based on the received permit information, and instructions for providing a confirmation based on payment information of a fee associated with the response piece permit; and
      a design application configured for execution by the central processing unit comprising instructions for receiving design information and generating the response piece mailpiece based on the standardized address and the design information.

2. The system of claim 1 wherein the design application further comprises instructions for generating the response piece mailpiece according to USPS specifications.

3. The system of claim 1 wherein the design information comprises artwork.

4. The system of claim 1 further comprising a download application configured for execution by the central processing unit comprising instructions for providing the response piece mailpiece to the user in a format such that the user can download and print the response piece mailpiece.

5. The system of claim 1 wherein the address code application generates a unique address code based on the address code information.

6. The system of claim 5 wherein the design application generates the response piece mailpiece based on the standardized address, the design information, the permit, and the address code.

7. The system of claim 1 further comprising a payment application configured for execution by the central processing unit comprising instructions for:
   receiving an identification of a permit fee;
   receiving payment information for payment of the identified permit fee; and
   sending the payment information to a permit system for processing the permit fee.

8. The system of claim 1 further comprising a database for storing response piece information.

9. The system of claim 8 wherein the design application further comprises instructions for storing the response piece mailpiece and the design information in the database.

10. The system of claim 8 wherein the address code application further comprises instructions for storing the standardized address in the database.

11. The system of claim 8 wherein the design application further comprises instructions for accessing the information stored in the database to generate the response piece mailpiece.

12. The system of claim 1 wherein the design application further comprises instructions for generating the response piece mailpiece comprising a unique code for alerting mail processing equipment to perform a function.

13. The system of claim 12 wherein the function comprises recording return of the mailpiece.

14. The system of claim 9 wherein the function comprises reading information from the mailpiece to provide to the user.

\* \* \* \* \*